(No Model.)
G. W. AMOS.
DRIVING GEARING FOR CYCLES.
No. 565,659. Patented Aug. 11, 1896.
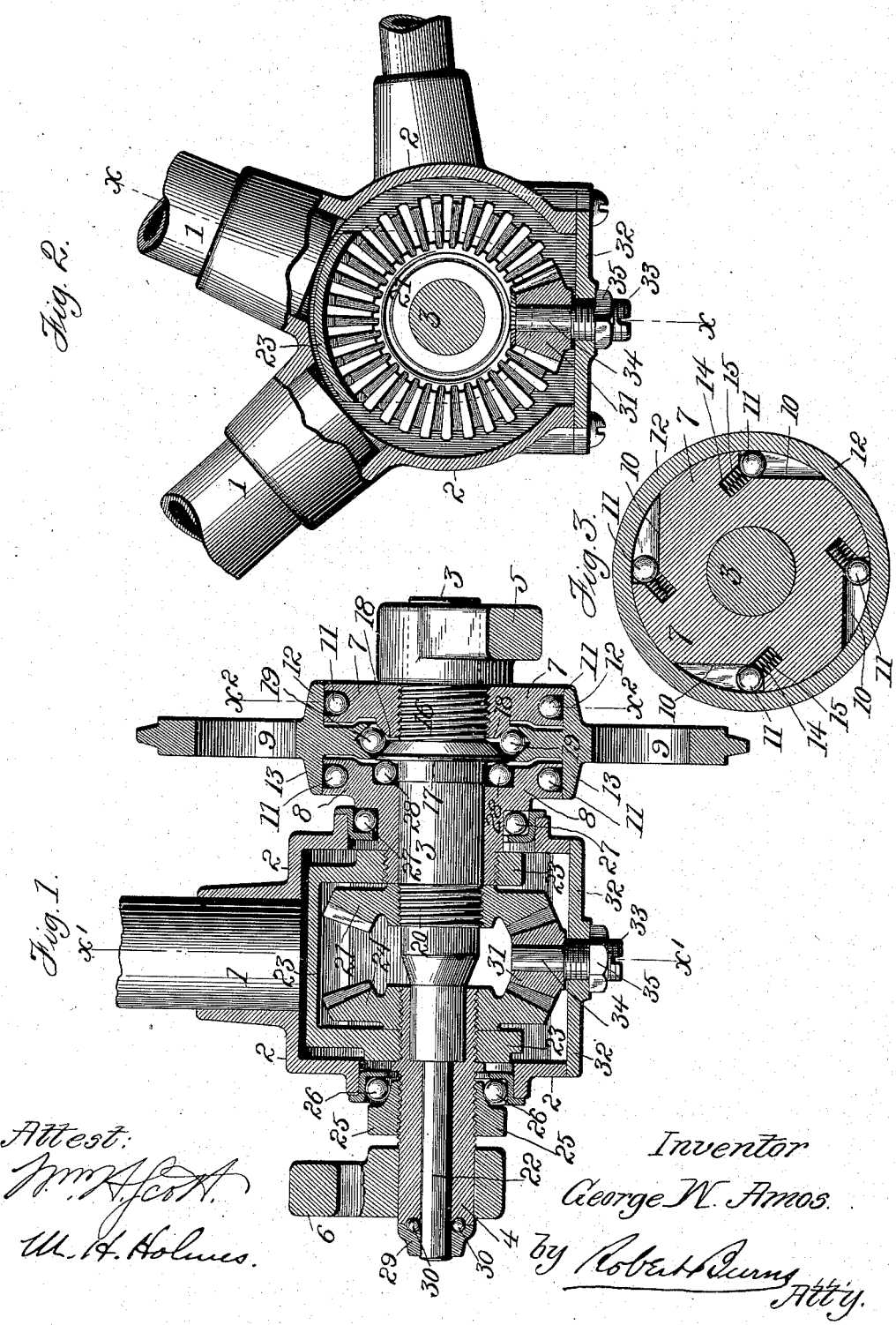
Attest:
Wm H Scott
M. H. Holmes
Inventor
George W. Amos
by Robert Burns
Atty.

UNITED STATES PATENT OFFICE.

GEORGE W. AMOS, OF CHICAGO, ILLINOIS.

DRIVING-GEARING FOR CYCLES.

SPECIFICATION forming part of Letters Patent No. 565,659, dated August 11, 1896.

Application filed January 20, 1896. Serial No. 576,213. (No model.)

*To all whom it may concern:*

Be it known that I, GEORGE W. AMOS, a citizen of the United States, residing at Chicago, in the county of Cook and State of Illinois, have invented a certain new and useful Improvement in Driving-Gearing for Cycles; and I do hereby declare the following to be a full, clear, and exact description of the same, reference being had to the accompanying drawings, forming a part of this specification.

The present invention relates to that type of driving-gearing for bicycles and the like in which a pair of oppositely-rocking pedals or arms are adapted to impart a continuous rotative movement to an axle or wheel common to both operating pedals or arms, and which shaft is adapted in turn to drive the operating or traction wheel of the vehicle; and the present improvement has for its object to provide a simple, compact, and efficient connecting mechanism between the rocking pedals or arms and the axle or wheel to be driven thereby, and in which means is provided whereby the operating pedals or arms are made to positively rock or oscillate in opposite directions, all as will hereinafter more fully appear, and be more particularly pointed out in the claims. I attain such object by the construction and arrangement of parts illustrated in the accompanying drawings, in which—

Figure 1 is a transverse sectional elevation at line $x\,x$, Fig. 2, of the pedal-bearing portion of a safety-bicycle frame to which the present improvement is applied; Fig. 2, a longitudinal section of the same at line $x'\,x'$, Fig. 1; Fig. 3, a detail longitudinal section at line $x^2\,x^2$, Fig. 1, illustrating the means for attaining frictional engagement between the axles of the operating-pedals and the driven wheel.

Similar numerals of reference indicate like parts in the several views.

In the accompanying drawings my invention is shown in a form adapted for use on the usual type of safety-bicycles, in which the rear wheel of the cycle is connected by a chain-and-sprocket gearing to the shafts or axles of the driving-pedals.

In the construction shown, 1 represents a portion of a bicycle-frame, of which the usual transversely-arranged sleeve or housing 2 forms a part to afford a support or bearing for the arbors or axles of the operating-pedals of the present invention in their rocking movement. Such arbors or axles 3 and 4 are two in number and individual to the pair of operating pedals or arms 5 and 6. Each arbor or axle is provided with a friction-disk 7 or 8, rigidly secured to its individual arbor or axle and provided on its periphery with means for engaging or clutching the driving sprocket-wheel 9 of the bicycle when the pedal or arm of either friction-disk is depressed by the foot of the operator, and so impart movement in one direction only to the sprocket-wheel 9. Any usual and well-known form of friction or ratchet mechanism may be used in this connection, preference being given to that form shown, and in which the periphery of the disks 7 and 8 is provided with tangential tracks or grooves 10, that carry friction balls or rolls 11, which, in an active movement of either friction-disk 7 or 8, move outward upon such track to bind against the inner surface of the annular rims 12 and 13 of the driving sprocket-wheel 9 to lock the same to the particular disk making an active movement, and so impart motion in one direction only to the aforesaid driving sprocket-wheel.

14 are springs arranged in socket-holes 15, behind the balls 11, and tending to force the same into contact with the inner surfaces of the annular rims 12 and 13, as indicated in Fig. 3 of the drawings.

The arbor or axle 3 (shown to the right in the drawings) is of a cylindrical formation, having at its extreme end to the right a shank for the attachment of the operating pedal or arm 5, immediately adjacent thereto a screw-threaded portion 16 for the rigid attachment of the friction-disk 7, a fixed cone 17 to form in conjunction with the cone 18 on the friction-disk 7 a circular runway or track for the series of balls 19 that constitute the supporting-bearing for the sprocket-wheel 9, as indicated in Fig. 1 of the drawings, an intermediate screw-threaded and shouldered portion 20 for the reception of the bevel-gear 21, and a reduced extension 22, that is adapted to bear within the bore of the other arbor or axle, as hereinafter set forth.

The arbor or axle 4 (shown to the left in the drawings) is of a tubular or sleeve formation and made in two parts or sections that are connected together within the main supporting sleeve or housing 2 of the cycle-frame by means of a connecting-yoke 23, that spans the connecting-gears hereinafter described.

In the present improvement the connection between the two parts or sections of the tubular arbor 4 and the connecting-yoke 23 is made by means of screw-threaded and shouldered formations on the respective ends of the sections, that are adapted to screw into the screw-threaded hubs of the connecting-yoke 23, and thus admit of the ready and convenient assemblage of the parts together within the main sleeve or housing 2.

The screw-threaded formation of the arbor-section shown to the left in the drawings is also adapted to receive the bevel-gear 24, counterpart to the bevel-gear 21 on the other axle or arbor 3.

The tubular arbor or axle 4 is provided at its extreme end to the left with a shank for the attachment of the operating pedal or arm 6, and next adjacent thereto a screw-threaded portion for the reception of the cone 25 of the ball-bearing 26, by which the end just described of the said arbor 4 is supported in the main sleeve or housing 2. The opposite end of such arbor or axle 4 carries the friction-disk 8, heretofore described, and is connected to the adjacent end of the main supporting-housing 2 by a ball-bearing 27, and to the other axle or arbor 3 by a ball-bearing 28.

In the construction shown the reduced extension 22 of the arbor or axle 3 projects out through the end of the hollow axle or arbor 4, and is provided with an attaching-nut 29 on its extreme end, by which the parts are more securely held together, and which enables an adjustment of the different bearing parts being effected to take up for wear, &c.

30 are a series of balls arranged in a runway between the nut 29 and the end of the axle or arbor 4 to reduce the friction between said parts.

31 is a bevel-pinion having bearing within the main housing or sleeve 2 and meshing with the respective bevel-gears 21 and 24 on the arbors or axles 3 and 4, the arrangement being such that a positive downward and active rocking movement of the one pedal and arbor will, through the instrumentality of the reversing and connecting train of gears 21, 24, and 31, impart a corresponding upward and reversed rocking movement to the other pedal and arbor, and vice versa, during the continued operation of the mechanism by the feet of the rider.

The bevel-pinion 31 is preferably supported upon a removable cap 32, secured to the under side of the main housing or sleeve 2, and which cap is employed to close an opening in the side wall of such housing that is employed for the initial introduction of the gearing and connecting-yoke prior to the assemblage together within such housing.

In the construction shown, 33 is a screw-threaded plug screwing through a boss or said cap 32, and provided at its upper end with an arbor-pin 34 for the support of the bevel-pinion 31 and near its lower end with a lock-nut 35, by which it is secured to its desired adjustment.

Having thus fully described my said invention, what I claim as new, and desire to secure by Letters Patent, is—

1. In a driving-gear for cycles, the combination of a pair of rocking axles, a driving-wheel, friction or clutch mechanisms between the said axles and said wheel, and a reversing mechanism connecting the axles together and adapted to cause the same to have movement in opposite directions, one of the axles being made in sections and connected together by a yoke that spans the reversing mechanism, substantially as set forth.

2. In a driving-gearing for cycles, the combination of a pair of rocking arbors or axles, a driving-wheel, a friction or clutch mechanism between the axles and said wheel, the same consisting of disks 7, 8, having tangential tracks 10, balls or rolls 11, and annular rims 12 and 13, and a reversing mechanism connecting the arbors or axles together and adapted to cause the same to have movement in opposite directions, substantially as set forth.

3. In a driving-gearing for cycles, the combination of a pair of rocking arbors or axles, one of which is made in two parts connected together by a yoke 23, a driving-wheel, a friction or clutch mechanism between the axles and such wheel, and a reversing mechanism connecting the arbors or axles together, the same consisting of the bevel-gears 21 and 24, on the respective axles, and a connecting bevel-pinion 31, on the main housing 2, substantially as set forth.

4. In a driving-gearing for cycles, the combination of a pair of rocking arbors or axles, one of which is made in two parts connected together by a yoke 23, a driving-wheel, a friction or clutch mechanism between the axles and such wheel, a reversing mechanism connecting the arbors or axles together, the same consisting of the bevel-gears 21 and 24, on the respective axles, and a connecting bevel-pinion 31, and a main inclosing housing 2, on the frame of the cycle provided with a bottom opening closed by a cap 32, substantially as set forth.

5. In a driving-gearing for cycles, the combination of a pair of rocking arbors or axles, one of which is made in two parts connected together by a yoke 23, a driving-wheel, a friction or clutch mechanism between the axles and such wheel, a reversing mechanism connecting the arbors and axles together, the same consisting of the bevel-gears 21 and 24, on the respective axles, and connecting bevel-pinion 31, and a main inclosing housing 2, on the frame of the cycle, provided with a bottom opening closed by a cap 32, that is provided with an adjustable support for the pinion 31, consisting of a screw-threaded plug 33, having an arbor 34, and lock-nut 35, substantially as set forth.

In testimony whereof witness my hand this 18th day of January, 1896.

GEORGE W. AMOS.

In presence of—
ROBERT BURNS,
M. H. HOLMES.